US005465871A

United States Patent [19]
Robbins, III

[11] Patent Number: 5,465,871
[45] Date of Patent: Nov. 14, 1995

[54] SPICE JAR AND ASSOCIATED DISPENSER CAP

[76] Inventor: Edward S. Robbins, III, 2802 E. Avalon Ave., Muscle Shoals, Ala. 35661

[21] Appl. No.: 237,336

[22] Filed: May 3, 1994

Related U.S. Application Data

[63] Continuation of Ser. No. 979,042, Nov. 19, 1992, abandoned.

[51] Int. Cl.⁶ .................................................. B67D 5/33
[52] U.S. Cl. ...................... 222/023; 222/142.5; 222/456; 222/480
[58] Field of Search .................................. 222/23, 142.4, 222/142.5, 424.5, 425, 454, 456, 480, 481

[56] References Cited

U.S. PATENT DOCUMENTS

| | | | |
|---|---|---|---|
| 1,273,012 | 7/1918 | Souther | 222/456 |
| 1,714,368 | 5/1929 | Hobson | 222/553 X |
| 1,802,284 | 4/1931 | Stoddard | 222/572 X |
| 2,214,437 | 9/1940 | Punte et al. | 206/42 |
| 2,370,820 | 3/1945 | Stott | 222/456 |
| 2,449,285 | 9/1948 | Ekstrom | 222/548 |
| 2,784,884 | 3/1957 | Borie, Jr. | 222/336 |
| 2,804,103 | 8/1957 | Wall | 141/381 |
| 2,811,281 | 10/1957 | Donovan | 222/81 |
| 2,840,124 | 6/1958 | Greene | 141/381 |
| 2,844,266 | 7/1958 | Hofe | 215/64 |
| 3,020,659 | 2/1962 | Paulini | 40/307 |
| 3,033,420 | 5/1962 | Thomas et al. | 222/456 X |
| 3,140,799 | 7/1964 | Mehr | 222/131 |
| 3,424,355 | 1/1969 | Blumen | 222/450 |
| 3,486,665 | 12/1969 | La Croce | 222/480 |
| 3,860,111 | 7/1975 | Thompson | 206/534 |
| 3,948,105 | 4/1976 | Johnson, Jr. | 73/427 |
| 4,069,935 | 1/1978 | Hampel | 215/203 |
| 4,083,467 | 4/1978 | Mullins et al. | 220/90.4 |
| 4,144,989 | 3/1979 | Joy | 222/456 X |
| 4,164,301 | 8/1979 | Thayer | 220/253 |
| 4,292,846 | 10/1981 | Barnett | 73/427 |
| 4,346,823 | 8/1982 | Eppenbach | 222/456 X |
| 4,376,497 | 3/1983 | Mumford | 222/153 |
| 4,399,928 | 8/1983 | Klingler | 220/335 |
| 4,544,063 | 10/1985 | Neward | 206/540 |
| 4,580,687 | 4/1986 | Lewis | 215/237 |
| 4,606,481 | 8/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,646,948 | 3/1987 | Jennings | 222/454 |
| 4,691,821 | 8/1987 | Hofmann | 206/216 |
| 4,693,399 | 9/1987 | Hickman et al. | 222/480 |
| 4,714,181 | 12/1987 | Kozlowski et al. | 222/480 |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,139,181 | 8/1992 | VerWeyst | 222/480 |

Primary Examiner—David M. Mitchell
Assistant Examiner—Joseph A. Kaufman
Attorney, Agent, or Firm—Nixon & Vanderhye

[57] ABSTRACT

In accordance with this invention, the conventional screw or snap-on type closure is replaced with a dispensing cap which incorporates a volumetric space to thereby permit precisely measured amounts of contents to be poured from the dispensing cap. The cap in this exemplary embodiment is constructed of a transparent plastic material and is provided with volume indicators to assist the user in measuring precisely desired amounts as the contents are transferred from the jar into a volumetric space provided in the dispensing cap.

13 Claims, 3 Drawing Sheets

Fig. 2
Fig. 4
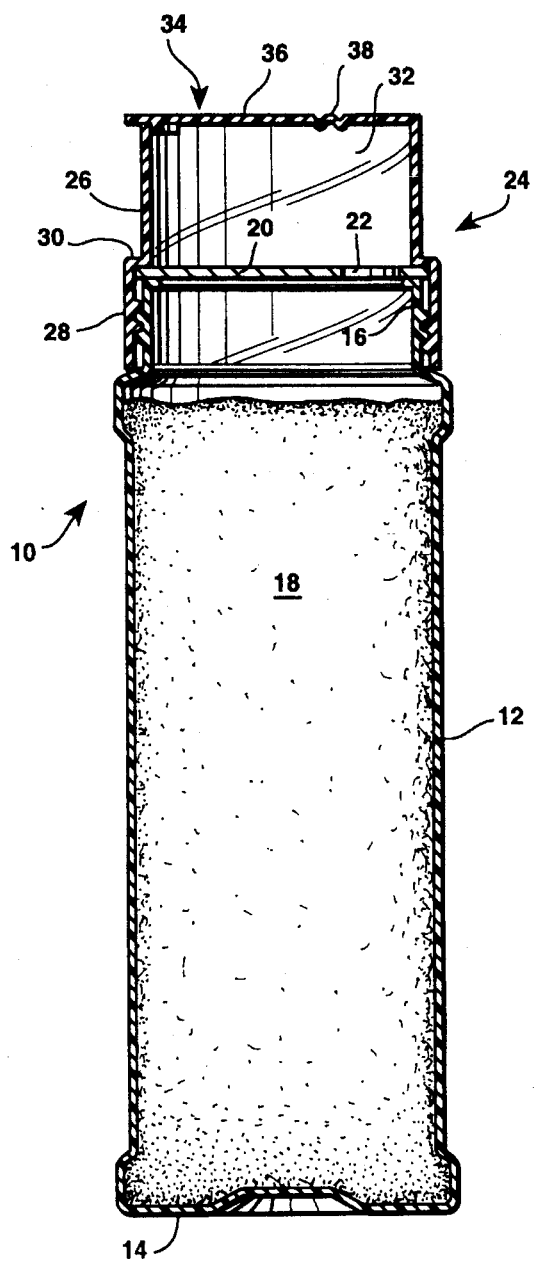
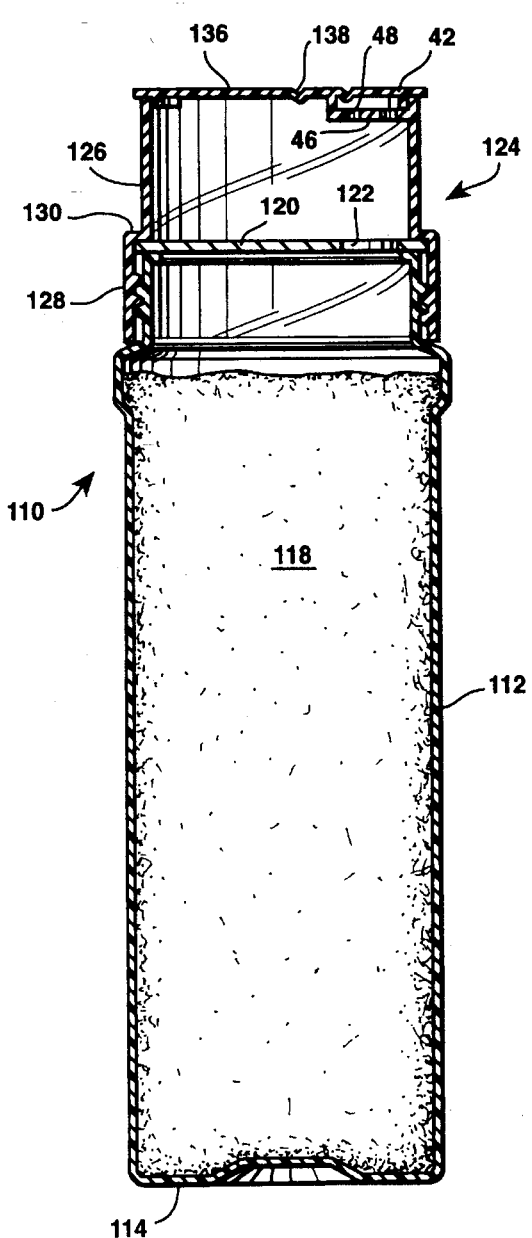

SPICE JAR AND ASSOCIATED DISPENSER CAP

This is a continuation of application Ser. No. 07/979,042, filed Nov. 19, 1992, now abandoned.

BACKGROUND OF THE INVENTION

The present invention relates generally to dispensing containers and, more specifically, to a dispensing container wherein predetermined amounts of the container contents may be poured into a hollow measuring cap mounted on the container. The measured amount is isolated from the remainder of the container contents, and may be dispensed therefrom through an opening in the cap, thus eliminating the need for separate measuring devices such as cups, spoons, or the like.

Dispensing containers are, of course, well known and are used in many different industries, for many different purposes. One such area is the food industry and a specific example includes jars and other similar containers which contain solid foods, such as spices, in particulate, granular or powder-like form. Typically, a measuring spoon or cup is utilized in conjunction with the jar or container so that the contents may be poured into the spoon or cup until a measured amount (as determined by the size of the spoon or gradations on the cup) dispensed from the container.

The present invention eliminates the need for measuring spoons or cups by providing a hollow cap or cover for an otherwise standard or conventional container which serves as its own measuring device. While the integration of a measuring function into a container construction for the discharge of predetermined amounts o the container contents is not new (see for example, U.S. Pat. Nos. 1,802,284; 2,804,103; 3,860,711; 4,613,057 and 4,635,828) the present invention provides an improved and simplified structure for accomplishing this result, while retaining the desirable option of substantially unrestricted pouring and/or shaking (i.e., sprinkling) of the container contents from the dispenser cap without regard to the amount discharged.

In a first exemplary embodiment, a substantially cylindrical container body formed of glass, plastic, paper board, cardboard or other suitable material includes a peripheral side wall extending upwardly from a bottom wall and terminating at an upper open end. The upper open end typically includes means for securing a closure of the threaded or snap-on type. In conventional spice jars or containers of this type, a dispensing disk is usually inserted over the upper open end of the container (or is made an integral part of the closure) and is provided with one or more dispensing apertures for pouring or sprinkling the contents. In some conventional arrangements, a single relatively large dispensing aperture is provided while in still other arrangements, a plurality of variously sized apertures are provided for selective use by the user.

In accordance with this invention, the conventional screw or snap-on type closure is replaced with a dispensing cap which incorporates a volumetric space to thereby permit precisely measured amounts of contents to be poured from the dispensing cap. The cap in this exemplary embodiment is constructed of a transparent plastic material and is provided with volume indicators to assist the user in measuring precisely desired amounts as the contents are transferred from the jar into a volumetric space provided in the dispensing cap.

In order to successfully dispense a measured amount of contents from the dispensing cap without further material being transferred into the dispensing cap from the jar or container, a dispensing door provided on the cap must be located in diametrically opposed relationship to the dispensing aperture in the container disk so that the disk in effect provides a dam or weir against further transfer of material through the container dispensing aperture into the volumetric space created in the cap.

In a second exemplary embodiment, the dispensing cap is provided with a pair of side-by-side dispensing doors. The second dispensing door is radially and axially aligned with the dispensing aperture in tile bottle or container disk so that the user has the option to pour the contents of the container straight through the dispensing cap without regard for the amount of material dispensed. Thus, the user has the flexibility in this second exemplary embodiment to utilize the dispensing cop as a measuring cup or simply as a traditional dispensing cap.

In accordance with one aspect of the invention, there is provided a measuring/dispensing jar comprising a container body having a bottom wall and a peripheral side wall extending upwardly from the bottom wall and terminating at an upper open end defined by a rim, the upper open end including first means for receiving a cap, and a measuring/ dispensing cap including a top wall having at least one dispensing door, and a peripheral depending skirt extending downwardly from the top wall, the peripheral skirt being divided into upper and lower portions, the lower portion including second means cooperable with the first means for removably securing the measuring/dispensing cap on the upper open end of the container body, and the upper portion including a volumetric space for receiving contents from said container body, and a disk having at least one dispensing aperture therein, the disk between the upper and lower portions of the skirt.

In accordance with another aspect, there is provided a measuring/dispensing cap for use with a standard jar having a bottom and a peripheral side wall terminating at an open upper end, tile cap including first means for receiving a cap; and a measuring/dispensing cap including a top wall having at least one dispensing door, and a peripheral depending skirt extending downwardly from the top wall, the peripheral skirt being divided into upper and lower portions, the lower portion including second means cooperable with the first means for removably securing the measuring/dispensing cap on the upper open end of the container body, and the upper portion including a volumetric space for receiving contents from the container body; and a partition having at least one dispensing aperture therein, the partition located between the upper and lower portions of the skirt.

In still another aspect, there is provided a measuring/ dispensing jar comprising a container body having a bottom wall and a peripheral side wall extending upwardly from the bottom wall and terminating at an upper open end defined by a rim; the upper open end including first means for receiving a cap; and a measuring/dispensing cap including a top wall having at least one dispensing door, and a peripheral depending skirt extending downwardly from the top wall, the peripheral skirt being divided into upper and lower portions, the lower portion including second means cooperable with the first means for removably securing the measuring/ dispensing cap on the upper open end of the container body, and the upper portion including a volumetric space for receiving contents from the container body; and a partition having at least one dispensing aperture therein, the partition located between the upper and lower portions of the skirt, and wherein the measuring/dispensing cap is transparent and includes volumetric gradations in at least the upper skirt portion.

A detailed description follows, from which additional objects and advantages may become apparent.

BRIEF DESCRIPTION OF THE DRAWINGS

FIG. 2 is a side elevation view, in section, of the spice jar and associated dispenser cap illustrated in FIG. 1;

FIG. 4 is a side elevation view, in section, of the spice jar and associated dispenser cap illustrated in FIG. 3.

DETAILED DESCRIPTION OF THE DRAWINGS

Figure 1:
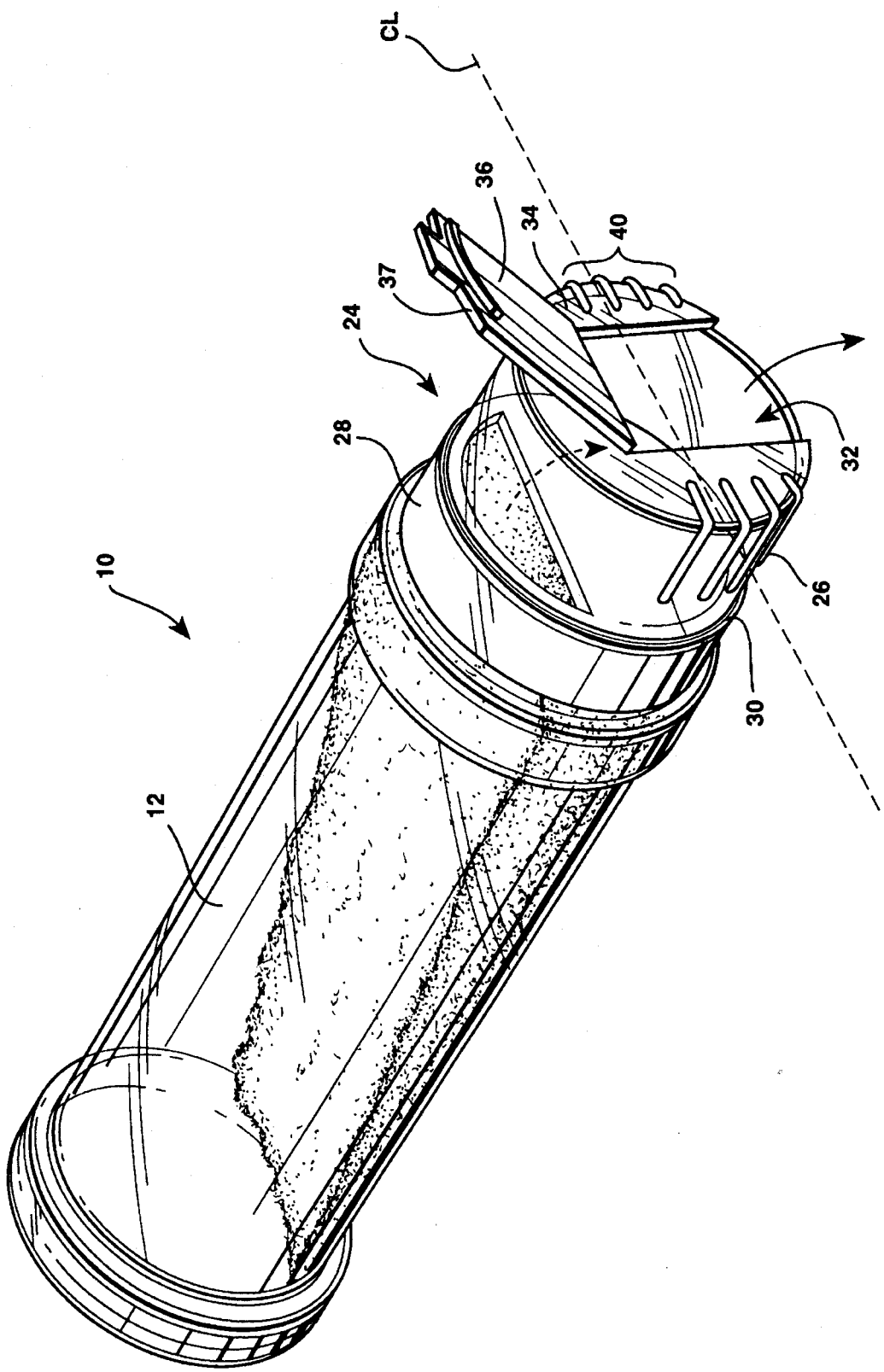
FIG. 1 is a perspective view of a spice jar and associated dispenser cap in accordance with a first exemplary embodiment of the invention.

With reference now to FIG. 1 and 2, the jar or container 10, which is of a conventional spice jar construction, includes a peripheral side wall 12 extending upwardly from a bottom wall 14, terminating in a threaded upper open end portion 16. The upstanding threaded portion 16 typically receives a conventional closure which, as described below, is replaced by the dispenser cap in accordance with this invention.

The jar is shown to include powdered or granular contents 18 which may be any of a variety of substances characterized broadly as spices, but it should be understood that the jar and cap construction in accordance with this invention is suitable for use with other powder and/or granulated materials as well.

In the conventional spice bottle jar, there is typically provided a dispensing disk 20 provided with a dispensing aperture 22 which overlies the upper open end of the jar and which would normally be utilized by the consumer to dispense the contents of the jar into a measuring cup or measuring spoon (or directly on a food product). In the event the dispensing disk 20 incorporates only a single relatively large opening as illustrated at 22, it may be retained for use with this invention. If, on the other hand, the dispensing disk is of the type which includes a plurality of various sized openings for selective use by the consumer, that disk would be replaced by a disk with a single relatively large opening of the type illustrated at 22.

Other conventional spice jars have dispensing caps with one or more built in dispensing apertures and associated hinged doors. For this type of spice jar, the measuring/dispenser cap of this invention would simply replace the entire known dispenser cap.

The measuring/dispensing cap 24 is preferably made of a transparent plastic material and includes a depending skirt portion which is divided into upper add lower sections 26, 28, respectively, by an annular shoulder 30. The lower skirt portion 28 is provided with internal threads adapted to cooperate with the external threads on the upstanding dispensing portion of the jar in the manner of a typical threaded closure. The upper portion 26 of the cap defines a volumetric space 32 from which measured amounts of contents 18 can be dispensed as described in greater detail below. The disk 22 is clamped to the container rim by shoulder 30 of the measuring/dispensing cap.

The peripheral skirt 24 of the measuring/dispensing cap terminates at a top wall 34 which incorporates a flip open dispensing door 36 integrally hinged to the top wall 34 at 38.

Level or volume indicators 40 (for example ½ oz., 1 oz., 1 ½ oz., etc. ) are provided on the periphery of upper skirt portion 26 of the cap, and may if desired, extend across part or all of the top wall 34 (including the door 36) for ease of use.

In use, the measuring/dispensing cap 24 will be applied to the container 10 such that the dispensing door 36 will lie in diametrically opposed relationship to the dispensing aperture 22 in the disk 20 as best seen in FIG. 1. With the door 36 in the closed position, the user may tilt the container 10 until contents spill over the disk 20 through aperture 22 and into the volumetric space 32 of the cap 24. As also best seen in FIG. 1, when the container is so tilted, the user may easily determine the volume of contents transferred to the dispensing cap with the assistance of the level indicators 40. When the desired amount of contents have been transferred to the dispensing cap, the flip open door 36 may be opened and the contents poured out of the cap. Because of the relative location of the aperture 22 and the door 36, the contents within the cap may be poured of the cap through the door 36 without additional contents spilling through the aperture 22 and into the volumetric space 32. In other words, the aperture 22 and the remote tree edge 37 of the door 36 lie on opposite sides of a horizontal center line CL of the cap extending parallel to a straight edge 23 of the aperture 22 (and also parallel to the door hinge).

It will be appreciated that, although not necessary, a second disk could be provided in either overlying or underlying relationship to the disk 20 and rotatable relative thereto in order to close off the aperture 22 following transferal of a measured amount of contents into the volumetric space 32. It will also be appreciated that where no additional underlying or overlying disk is employed, modifications may be made which will fix the relative position of the aperture 22 in disk 20 relative to the dispensing door 36. This can be done by appropriate locators for the disk, and/or insuring that the thread configuration by which the cap is attached to the jar is arranged so that the aperture 22 and door 36 are appropriately located upon full tightening of the cap 24.

The invention as described above thus provides an integral measuring/dispensing cap which is adapted for use with conventional spice jars/containers without change to the jar or container. This construction eliminates the requirement for a separate utensil such as a measuring spoon or measuring cup and allows the user to simply axed conveniently dispense measured amounts of spices or other powdered or granular substances from a container in a simple two-step process.

Figure 3:
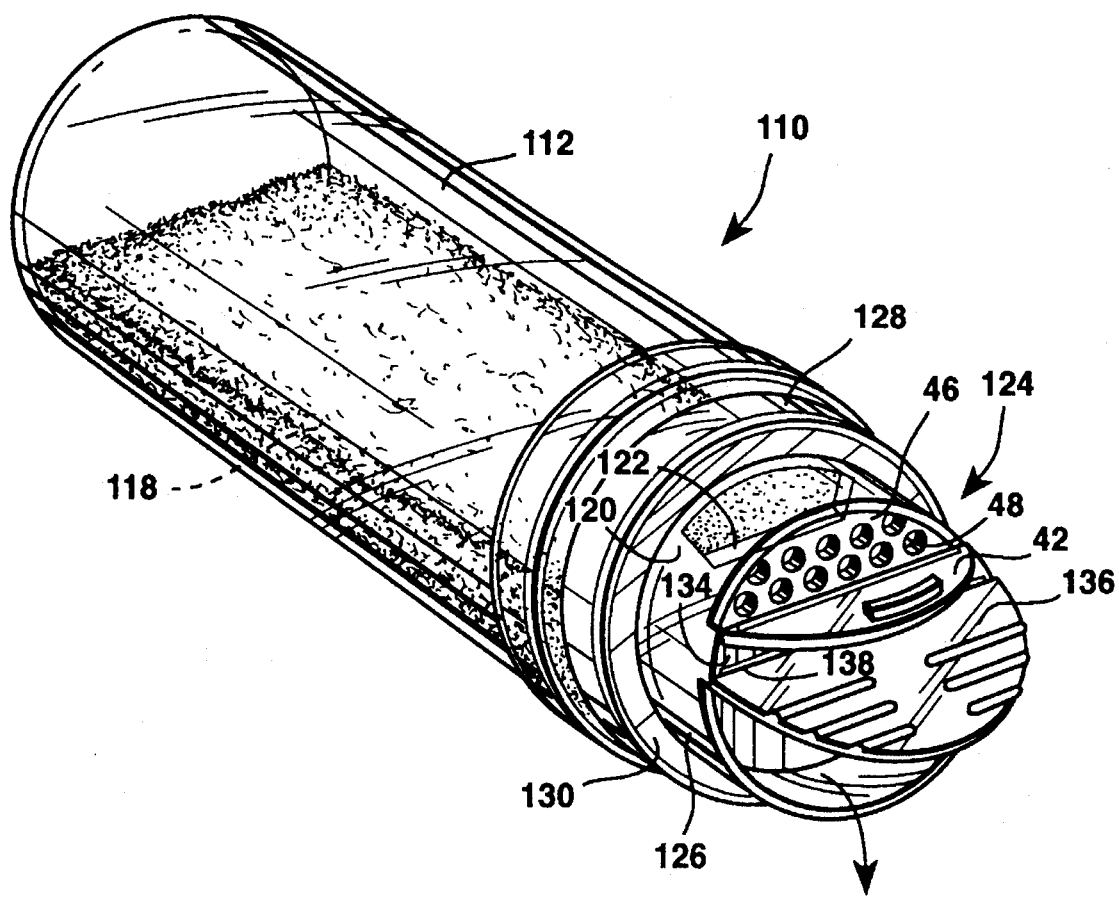
FIG. 3 is a perspective view of a spice jar and associated dispenser cap in accordance with a second exemplary embodiment of the invention.

Turning now to FIGS. 3 and 4, a second exemplary embodiment of the invention is illustrated wherein reference numerals similar to those used in FIGS. 1 and 2 are employed, but with the prefix "1" added. This second exemplary embodiment of the invention differs from the first described embodiment in that a second flip type door is provided in side-by-side relationship to the door 136. This second dispensing door 42 (which may also be integrally hinged to the cap top wall 134) has an underlying perforated plate-like member 46 provided with a plurality of small dispensing holes 48. As apparent from FIGS. 3 and 4, the array of apertures 48 are aligned with the dispensing aperture 122, thereby enabling the user to utilize the spice jar and associated measuring/dispensing cap in a different operating mode than that described above in connection with the embodiment illustrated in FIGS. 1 and 2. In other words, the user now has the option to dispense measured amounts through the door 136 or to simply rotate the jar and dispense contents through the aperture 122 and dispensing apertures 48 directly without concern for specific measured amounts. The use of a plurality of small apertures 48 permits the contents to be sprinkled where desired and, during this mode of operation, the dispensing door 136 would, of course, remain closed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measuring/dispensing jar comprising a container body having a bottom wall and a peripheral side wall extending upwardly from said bottom wall and terminating at an upper open end defined by a rim; said upper open end including first means for receiving a cap; and a measuring/dispensing cap including a substantially planar top wall having at least one dispensing door pivotally mounted by an integral hinge within said top wall and including a free edge at the periphery of the top wall, a peripheral depending skirt extending downwardly from said top wall, said peripheral skirt being divided into upper and lower portions, said lower portion including second means cooperable with said first means for removably securing the measuring/dispensing cap on the upper open end of the container body;

a substantially parallel partition disk having at least one dispensing aperture therein, said dispensing aperture defined in part by a straight edge lying in the plane of said disk, said partition disk located between said upper and lower portions of said skirt to thereby form in combination with said top wall and said upper portion of said peripheral skirt one unobstructed, substantially cylindrical volumetric space for receiving contents from said container body, and wherein said straight edge of said dispensing aperture and said free edge of said dispensing door are located on opposite sides of a horizontal center line through the cap in a direction parallel to said integral hinge, thereby enabling container contents to be transferred to said volumetric space and to be subsequently discharged from said dispensing door without additional container contents spilling into said volumetric space; and wherein volumetric indicators are provided on said cap and located and arranged to permit a user to determine an exact amount of container contents transferred to said volumetric space while said container body is in a horizontal orientation.

2. The measuring/dispensing jar of claim 1 wherein said measuring/dispensing cap is transparent.

3. The measuring/dispensing jar of claim 1, wherein said upper and lower portions are separated by an annular shoulder, said partition being clamped between said shoulder and said rim.

4. The measuring/dispensing jar of claim 1, wherein a second dispensing door is provided in said top wall of said measuring/dispensing cap.

5. A measuring/dispensing cap for use with a standard jar having a bottom and a peripheral side wall terminating at an open upper end, the jar including first means for receiving said cap;

said measuring/dispensing cap including a substantially planar top wall having at least one dispensing door pivotally mounted by an integral hinge within said top wall and including a free edge at the periphery of the top wall, and a peripheral depending skirt extending downwardly from said top wall, said peripheral skirt being divided into upper and lower portions, said lower portion including second means cooperable with said first means for removably securing the measuring/dispensing cap on the upper open end of the container body, and said upper portion including a volumetric space for receiving contents from said container body; and a substantially planar partition disk having at least one dispensing aperture therein, said dispensing aperture defined in part by a straight edge lying in the plane of said disk, said partition disk located between said upper and lower portions of said skirt to thereby form in combination with said top wall and said upper portion of said peripheral skirt one unobstructed, substantially cylindrical volumetric space for receiving contents from said container body, and wherein said straight edge of said dispensing aperture and said free edge of said dispensing door are located on opposite sides of a horizontal center line through the cap in a direction parallel to said integral hinge, thereby enabling container contents to be transferred to said volumetric space and to be subsequently discharged from said dispensing door without additional container contents spilling into said volumetric space; and wherein volumetric indicators are provided on said cap and located and arranged to permit a user to determine an exact amount of container contents transferred to said volumetric space while said container body is in a horizontal orientation.

6. A measuring/dispensing jar of claim 5 wherein said measuring/dispensing cap is transparent.

7. The measuring/dispensing jar of claim 5, wherein said upper and lower portions are separated by an annular shoulder, said partition being clamped between said shoulder and said rim.

8. The measuring/dispensing jar of claim 5, wherein a second dispensing door is provided in said top wall of said measuring/dispensing cap.

9. A measuring/dispensing jar comprising a container body having a bottom wall and a peripheral side wall extending upwardly from said bottom wall and terminating at an upper open end defined by a rim; said upper open end including first means for receiving a cap;

a measuring/dispensing cap including a substantially planar top wall having at least one dispensing door pivotally mounted by an integral hinge within said top wall and including a free edge at the periphery of the top wall, and a peripheral depending skirt extending downwardly from said top wall, said peripheral skirt being divided into upper and lower portions, said lower portion including second means cooperable with said first means for removably securing the measuring/dispensing cap on the upper open end of the container body; and a substantially planar partition disk having at least one dispensing aperture therein, said dispensing aperture defined in part by a straight edge lying in the plane of said disk and on one side of a horizontal center line through the cap in a direction parallel to said integral hinge, said partition disk located between said upper and lower portions of said skirt to thereby form in combination with said top wall and said upper portion of said peripheral skirt one unobstructed, substantially cylindrical volumetric space in said upper portion for receiving measured amounts of contents from said container body, and wherein said free edge of said dispensing door is located on an opposite side of said horizontal center line, thereby enabling container contents to be transferred to said volumetric space and to be subsequently discharged from said dispensing door without additional container contents spilling into said volumetric space; and further wherein said measuring/dispensing cap is transparent and includes volumetric gradations in at least said upper skirt portion to permit a user to determine an exact amount of container contents transferred to said single volumetric space while said container body is in a horizontal orientation.

10. The jar of claim 9 wherein said upper and lower portions of said skirt are joined at an annular shoulder.

11. The jar of claim 9 wherein said top wall is formed with a pair of side-by-side dispensing doors, one of said doors being diametrically opposed to said at least one dispensing aperture.

12. The jar of claim 11 wherein both of said side-by-side dispensing doors are integrally hinged to said top wall.

13. The jar of claim 11 wherein another of said side-by-side dispensing doors is axially and radially aligned with said at least one dispensing aperture.

\* \* \* \* \*